US008695556B2

(12) United States Patent
Steiner et al.

(10) Patent No.: US 8,695,556 B2
(45) Date of Patent: *Apr. 15, 2014

(54) METHOD FOR BALANCING THE MASS FORCES OF AN INTERNAL COMBUSTION ENGINE AND INTERNAL COMBUSTION ENGINE FOR CARRYING OUT SUCH A METHOD

(75) Inventors: Bernd Steiner, Bergisch Gladbach (DE); Stefan Quiring, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,130

(22) Filed: Jul. 24, 2012

(65) Prior Publication Data

US 2013/0036995 A1 Feb. 14, 2013

(30) Foreign Application Priority Data

Aug. 11, 2011 (DE) .......................... 10 2011 080 601

(51) Int. Cl.
*F02B 75/06* (2006.01)
(52) U.S. Cl.
USPC ....................................................... 123/192.2
(58) Field of Classification Search
USPC ............................. 123/192.1, 192.2; 464/180
See application file for complete search history.

(56) References Cited

U.S. PATENT DOCUMENTS

| | | | | | |
|---|---|---|---|---|---|
| 4,556,026 | A | * | 12/1985 | Masuda et al. | 123/198 F |
| 4,569,316 | A | * | 2/1986 | Suzuki | 123/192.1 |
| 4,608,952 | A | * | 9/1986 | Morita et al. | 123/198 F |
| 4,658,777 | A | * | 4/1987 | Suzuki | 123/192.2 |
| 7,556,012 | B2 | * | 7/2009 | Quiring et al. | 123/192.2 |
| 2008/0276897 | A1 | * | 11/2008 | Petridis et al. | 123/192.2 |
| 2013/0036996 | A1 | * | 2/2013 | Quiring et al. | 123/192.2 |

FOREIGN PATENT DOCUMENTS

| | | | | | |
|---|---|---|---|---|---|
| GB | 2449157 | A | * | 11/2008 | F02D 35/02 |
| JP | 09096341 | A | * | 4/1997 | F16F 15/26 |
| JP | 2007046633 | A | * | 2/2007 | F16F 15/26 |

* cited by examiner

*Primary Examiner* — Hung Q Nguyen
(74) *Attorney, Agent, or Firm* — Julia Voutyras; Alleman Hall McCoy Russell & Tuttle LLP

(57) ABSTRACT

Embodiments for balancing an engine are provided. In one example, a method for balancing mass forces of a crank drive of an internal combustion engine having at least one cylinder comprises providing at least one balancing unit which has at least one balancing weight which serves as an unbalance and which rotates about a rotational axis when the balancing unit is operational, the at least one balancing unit being embodied as a switchable balancing unit, and switching on the at least one balancing unit as a function of at least one operating parameter of the internal combustion engine.

20 Claims, 4 Drawing Sheets

METHOD FOR BALANCING THE MASS FORCES OF AN INTERNAL COMBUSTION ENGINE AND INTERNAL COMBUSTION ENGINE FOR CARRYING OUT SUCH A METHOD

RELATED APPLICATIONS

The present application claims priority to German Patent Application Number 102011080601.6, filed on Aug. 8, 2011, the entire contents of which are hereby incorporated by reference for all purposes.

FIELD

The disclosure relates to a method for balancing the mass forces of a crank drive of an internal combustion engine.

BACKGROUND AND SUMMARY

Vibrations are becoming increasingly significant for the design and configuration of motor vehicles and internal combustion engines. It is attempted, inter alia, to influence and model specifically the sound generated by the internal combustion engine. Measures in this context are also combined under the term sound design. Such development work is also motivated by the realization that the customer's decision to purchase a motor vehicle is influenced to a significant and increasing degree, even decisively, by the sound of the internal combustion engine or of the vehicle. For example, the driver of a sports car prefers a vehicle or engine whose sound emphasizes the sporty character of the vehicle.

In the scope of a sound design, vibrations are compensated, e.g., eliminated or extinguished, or individual vibrations of a specific frequency are isolated, filtered out and, if appropriate, modeled.

The sources that may be differentiated as noise sources on a motor vehicle include flow noise, noise due to the emission of solid-borne sound, and noise due to the introduction of solid-borne sound into the vehicle bodywork via the engine mount.

Flow noise includes, for example, the noise at the mouth of the exhaust, the intake noise and the noise of the fan, while the noise due to the emission of solid-borne sound includes the actual engine noise and the emission of the exhaust system. The engine structure which is made to oscillate by shocks and alternating forces irradiates the solid-borne sound as airborne sound via its engine surfaces and in this way generates the actual engine noise.

The introduction of solid-borne sound via the engine mount, in particular the introduction of solid-borne sound into the vehicle bodywork, is of particular significance for the acoustic driving comfort.

The internal combustion engine and the associated secondary assemblies are systems which are capable of oscillating and whose oscillatory behavior can be influenced. The most relevant components with shock excitation and force excitation are the crank casing, the cylinder block, the cylinder head, the crank drive, the piston and the valve drive. These components are subject to the mass forces and gas forces. The crank drive comprises here, in particular, the crankshaft, the piston, the piston pin, and the connecting rod, and forms the system which is capable of oscillating and which is relevant for the method according to the disclosure.

The crankshaft is made to undergo rotational oscillations by the rotational forces which change over time and which are applied to the crankshaft via the connecting rods which are coupled to the individual crank pins. These rotational oscillations give rise both to noise due to the emission of solid-borne sound and to noise due to the introduction of solid-borne sound into the bodywork and into the internal combustion engine. When the crankshaft is excited in the natural frequency range, large rotational oscillation amplitudes may occur which can even lead to fatigue fracture. This shows that the oscillations are of interest not only in conjunction with a sound design but also with respect to the strength of the components.

The rotational oscillations of the crankshaft are transmitted in an undesirable fashion to the camshaft via the control drive or camshaft drive, wherein the camshaft itself also presents a system capable of oscillation and can cause other systems, in particular the valve drive, to oscillate. In addition, the oscillations of the crankshaft are introduced into the drive train, via which they can be passed to the tires of a vehicle.

The rotational force profile at a crankshaft throw of a four-stroke internal combustion engine is periodic, wherein the period extends over two revolutions of the crankshaft. The rotational force profile is normally decomposed into its harmonic components by means of Fourier analysis in order to be able to make statements about the excitation of rotational oscillations. In this context, the actual rotational force profile is composed of a constant rotational force and a multiplicity of harmonically changing rotational forces which have different rotational force amplitudes and frequencies or oscillation rates. The ratio of the oscillation rate n, of each harmonic to the rotational speed n of the crankshaft or of the engine is referred to as the order i of the harmonic.

Due to the high dynamic load on the crankshaft as a result of the mass forces and gas forces, typical internal combustion engines may be designed to implement mass balancing which is as wide ranging as possible, e.g., is optimized. In this context, the term "mass balancing" combines all the measures which compensate or reduce the effect of the mass forces toward the outside. To this extent, balancing the mass forces relates not only to the mass forces as such but also to the moments which are caused by the mass forces.

In this context, an approach to the solution in the targeted adjustment of the throw of the crankshaft, of the number and of the arrangement of the cylinders and of the ignition sequence exists in such a way that the best possible mass balancing is achieved.

A six-cylinder in-line engine can be completely balanced in this way. The six cylinders are combined in pairs in such a way that they run in parallel mechanically as a cylinder pair. The first and sixth cylinders, the second and fifth cylinders and the third and fourth cylinders are therefore combined to form a cylinder pair, wherein the crankshaft pins or crankshaft throws of the three cylinder pairs are each arranged offset by 120° CA on the crankshaft. Running mechanically in parallel means that the two pistons of the two cylinders which run mechanically in parallel are located at the same ° CA (degrees crank angle) at the top dead center (TDC) or bottom dead center (BDC). When a suitable ignition sequence is selected, the mass forces are completely balanced.

In the case of a three-cylinder in-line engine, the mass forces of the first order and the mass forces of the second order can also be completely balanced by selecting a suitable crankshaft throw and likewise a suitable ignition sequence, but not the moments which are caused by the mass forces.

Complete mass balancing, as in the case of the six-cylinder in-line engine described above, cannot always be implemented, and therefore further measures have to be taken, for example arranging counterweights on the crankshaft and/or equipping the internal combustion engine with at least one balancing shaft.

The starting point of these measures is that the crankshaft is loaded by the rotational forces which change over time and which are composed of the gas forces and mass forces of the crank drive. The masses of the crank drive, e.g., the individual masses of the connecting rods, of the piston, of the piston pin and of the piston rings, can be transferred into an oscillating equivalent mass and a rotating equivalent mass. The mass force of the rotating equivalent mass can easily be balanced in terms of their external effect by counterweights arranged on the crankshaft.

The balancing of the rotating mass force caused by the oscillating equivalent mass is more complex, said mass force being approximately composed of a mass force of the first order, which rotates at the engine speed and a mass of the second order which rotates at twice the engine speed, with higher order forces being negligible.

The rotating mass forces of any order can be virtually balanced by the arrangement of two shafts, referred to as balancing shafts, which rotate in opposite directions and are provided with corresponding weights. The shafts for the balancing of the mass forces of the first order rotate here at the engine speed and the shafts for balancing the mass forces of the second order rotate at twice the engine speed. This type of mass balancing is very costly, complex and has a high spatial requirement.

In addition, even in the case of complete balancing of the rotating mass forces, mass moments arise since the mass forces of the individual cylinders act at the central planes of the cylinders. These mass moments can be compensated in turn in an individual case by a balancing shaft which is equipped with weights. The latter increases the spatial requirement, the costs and the weight of the entire mass balancing, and therefore those of the drive unit additionally.

The moments caused by the mass forces of the first order, for example in the case of a three-cylinder in-line engine, can be compensated by a single balancing shaft which rotates at the engine speed in the opposite direction to the crankshaft and at whose ends two balancing weights which are arranged offset by 180° and serve as an unbalance are provided.

The provision of one balancing shaft or, if appropriate, a plurality of balancing shafts not only increases the spatial requirement and the costs, but also the fuel consumption. The increased fuel consumption is caused, on the one hand, by the additional weight of the balancing unit, in particular of the shafts, and of the counterweights which serve as an unbalance and which perceptively increase the overall weight of the drive unit. On the other hand, the balancing unit with its rotating shafts and other moving components contributes significantly to the frictional loss of the internal combustion engine and to the increase of this frictional loss. The latter has a relevance, in particular, due to the fact that the balancing unit is always and continuously operational as soon as the internal combustion engine starts and is operated. The mass forces are balanced continuously here without it being taken into account whether or not the instantaneous operating state of the internal combustion engine at all demands such mass balancing, for example for reasons of the sound design.

It would therefore be possible to dispense with balancing of the moments caused by the mass forces of the first order in a three-cylinder in-line engine at relatively high engine speeds since the noise caused by the oscillations are evaluated as being problematic only at low rotational speeds and during idling. On the other hand, at relatively high rotational speeds there is no indication for mass balancing for reasons of the sound design.

The conventional balancing units are also disadvantageous in that only a small degree of freedom of maneuver is present in terms of the structural configuration and the arrangement in the engine compartment. The balancing shafts which are usually used are driven mechanically on the crankshaft side via a belt drive or a pair of gearwheels and are therefore generally arranged underneath the crank casing.

The inventors herein have recognized the issues with the above approaches and offer an approach for mass balancing which includes a small space requirement, a small frictional loss and more structural freedom of maneuver in terms of the configuration of the balancing. Accordingly, a method for balancing mass forces of a crank drive of an internal combustion engine having at least one cylinder comprises providing at least one balancing unit which has at least one balancing weight which serves as an unbalance and which rotates about a rotational axis when the balancing unit is operational, the at least one balancing unit being embodied as a switchable balancing unit, and switching on the at least one balancing unit as a function of at least one operating parameter of the internal combustion engine.

The method according to the disclosure for mass balancing makes use of a switchable balancing unit which is activated, e.g., switched on, when indicated, but which can be deactivated, e.g., switched off, when not indicated. Examples of a switchable balancing unit are an electrically operated balancing unit in which, for the purpose of deactivation, the power supply is disabled, or a mechanically driven balancing unit in which switching off is carried out by interrupting the drive, for example by providing a clutch which, in the open position, interrupts the force flux from the belt drive or gearwheel drive to the at least one balancing shaft.

The balancing unit is switched here as a function of at least one operating parameter of the internal combustion engine. In this way, the method according to the disclosure permits mass balancing in a three-cylinder in-line engine at low rotational speeds and during idling, with mass balancing being dispensed with at relatively high rotational speeds by switching off the balancing unit, in order to reduce the frictional loss and therefore the fuel consumption. The use of a switchable balancing unit therefore permits mass balancing which is distinguished by a relatively low frictional loss.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2b shows an engine including the electrically operated balancing unit of FIG. 2a.

DETAILED DESCRIPTION

A balancing unit may be located on or near an engine in order to provide balance to the rotational oscillations present during operation of the engine. The balancing unit may include one or more balancing weights configured to rotate around an axis. The balancing unit may be switched on and off dependent on the operating state of the engine in order to provide counterbalance to the engine only when indicated, such as during low engine speed conditions.

Figure 1:
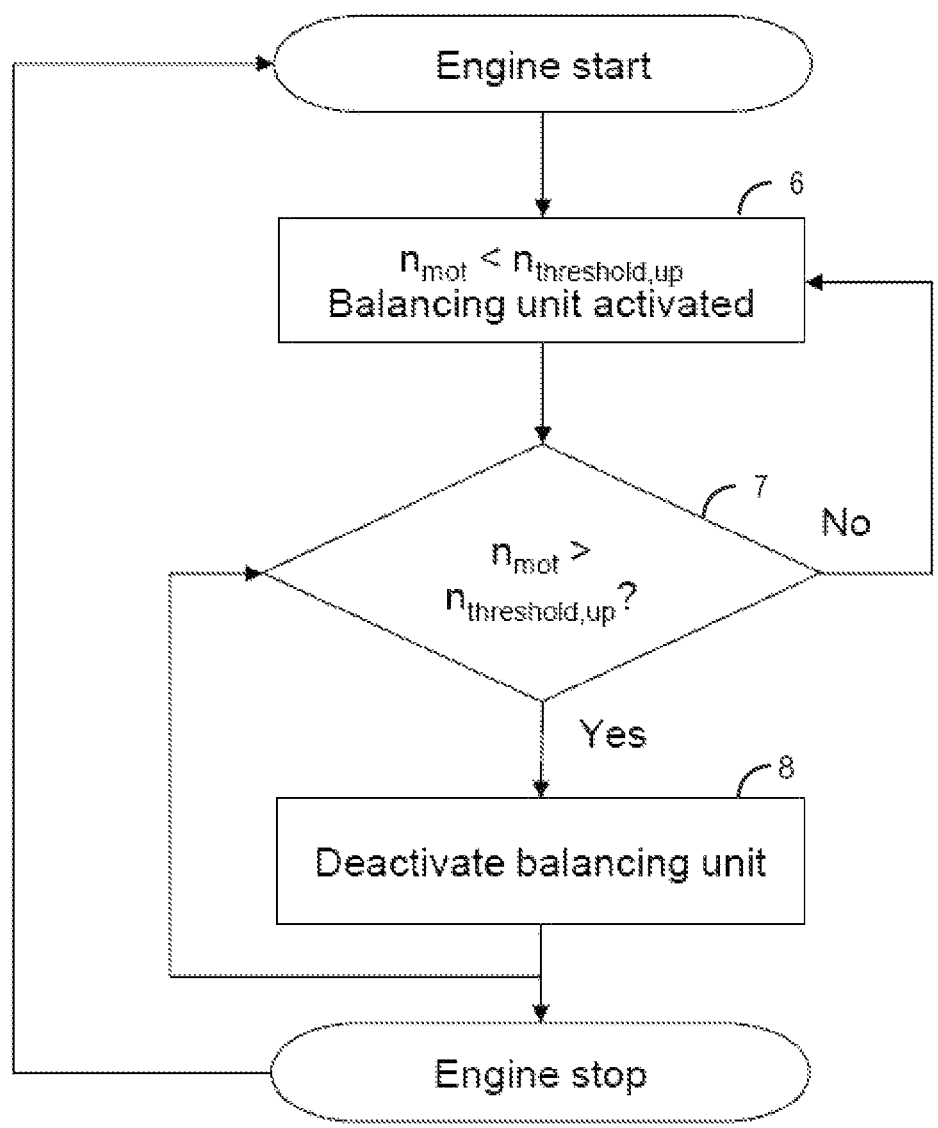
FIG. 1 shows a first embodiment of the method in the form of a flow diagram.

FIG. 1 shows a flow diagram illustrating a method for balancing an engine. The method of FIG. 1 may be carried out by an engine controller, such as the controller illustrated in FIG. 4 and explained below.

After the internal combustion engine starts, as indicated at 6, the at least one balancing unit is placed in the operational state, e.g., activated, for as long as the rotational speed $n_{mot}$ of the internal combustion engine is lower than a predefined rotational speed $n_{threshold,up}$. The following applies:

$$n_{mot} < n_{threshold,up}$$

Assuming that the balancing unit is operational, the rotational speed is monitored at 7 and the balancing unit is switched off at 8 as soon as the rotational speed $n_{mot}$ of the internal combustion engine exceeds a predefinable rotational speed $n_{threshold,up}$. The following applies:

$$n_{mot} > n_{threshold,up}$$

Assuming that the balancing unit is non-operational, the rotational speed is monitored further and the balancing unit is activated again as soon as the rotational speed $n_{mot}$ of the internal combustion engine undershoots the predefined rotational speed $n_{threshold,up}$ again.

If the internal combustion engine is switched off, the method starts again when the internal combustion engine is restarted with an operational balancing unit.

Examples of the method in which the at least one balancing unit is switched as a function of the rotational speed n of the internal combustion engine are advantageous. According to this example, the rotational speed n of the internal combustion engine is the at least one operating parameter as a function of which the balancing unit is switched on and off.

Since the mass moments and mass forces rotate at the engine speed or at a multiple of the engine speed, and the associated mass balancing occurs with correspondingly rotating balancing weights, the mass balancing has in principle a close relationship with the engine speed, for which reason the rotational speed n of the internal combustion engine is a suitable operating parameter for performing open-loop and/or closed-loop control of the balancing unit.

Examples of the method in which the at least one balancing unit—assuming an operational balancing unit—is switched off as soon as the rotational speed n of the internal combustion engine exceeds a predefinable rotational speed $n_{threshold,up}$ are advantageous.

The method variant above makes it possible to balance, in a three-cylinder in-line engine, the moments caused by the mass of forces of the first order at low rotational speeds and during idling by means of a switched-on, e.g., actuated, balancing unit, and to deactivate the balancing unit when a predefined rotational speed $n_{threshold,up}$ is exceeded in the direction of relatively higher rotational speeds at which there is no use for mass balancing, at least for reasons of sound design.

A particular advantage of the variant in question is that the balancing unit is switched off at high rotational speeds at which the frictional loss is generally at a maximum, for example in a characteristic diagram region of the internal combustion engine in which a perceptible saving in fuel can be made by switching off the balancing unit.

In this context, examples of the method in which the at least one balancing unit is switched off as soon as the rotational speed n of the internal combustion engine exceeds the predefined rotational speed $n_{threshold,up}$ and is higher for a predefinable time period $\Delta t_1$ than this predefined rotational speed $n_{threshold,up}$ are advantageous here.

The introduction of an additional condition for the switching off of the at least one balancing unit is intended to prevent excessively frequent switching, in particular deactivation of the balancing unit, if the rotational speed only briefly exceeds the predefined rotational speed and then drops again or fluctuates around the predefined value for the rotational speed without the exceeding justifying switching off of the balancing unit.

For the reasons mentioned above, method variants are also advantageous in which the at least one balancing unit—assuming a non-operational balancing unit—is switched on as soon as the rotational speed n of the internal combustion engine undershoots a predefinable rotational speed $n_{threshold,down}$.

In this context, in turn examples of the method in which the at least one balancing unit is switched on as soon as the rotational speed n of the internal combustion engine undershoots the predefined rotational speed $n_{threshold,down}$ and is lower than this predefined rotational speed $n_{threshold,down}$ for a predefinable time period $\Delta t_2$ are advantageous.

Reference is made to the statements which were made in conjunction with the exceeding of the rotational speed $n_{threshold,up}$ and the time period $\Delta t_1$. The statements made in relation to these method variants apply in an analogous fashion.

In a three-cylinder in-line engine it is advantageous, for example, to activate the balancing unit when a predefined rotational speed $n_{threshold,down}$ is undershot, in order to balance the moments caused by the mass forces of the first order.

In addition to the definition of a specific rotational speed $n_{threshold,up}$ or $n_{threshold,down}$ for switching off or switching on the balancing unit, rotational speed ranges within which the balancing unit is operated or else remains deactivated can also be predefined.

Examples of the method in which the at least one balancing unit—assuming a balancing unit which is non-operational—is switched on as soon as the rotational speed n of the internal combustion engine exceeds a predefinable rotational speed $n_{threshold,up}$, may also be advantageous.

In this context, examples of the method in which the at least one balancing unit is switched on as soon as the rotational speed n of the internal combustion engine exceeds the predefined rotational speed $n_{threshold,up}$ and is higher than this predefined rotational speed $n_{threshold,up}$ for a predefinable time period $\Delta_3$ may be advantageous.

Examples of the method in which the at least one balancing unit—assuming a balancing unit which is operational—is switched off as soon as the rotational speed n of the internal combustion engine undershoots a predefinable rotational speed $n_{threshold,down}$ may also be advantageous.

In this context, examples of the method in which the at least one balancing unit is switched off as soon as the rotational speed n of the internal combustion engine undershoots the predefined rotational speed $n_{threshold,down}$ and is lower than this predefined rotational speed $n_{threshold,down}$ for a predefinable time period $\Delta t_4$ may also be advantageous.

Examples of the method in which the at least one balancing unit is synchronized with the crank drive of the internal combustion engine during the switching on process are advantageous. In order to bring about mass balancing, the at least one balancing weight, serving as an unbalance, of the balancing unit which rotates about a rotational axis may have a specific, permanently predefined position of the crankshaft, e.g., with respect to the crank drive. To this extent, the balancing unit may be synchronized with the crank drive within the scope of the switching on process.

If the internal combustion engine is equipped with an engine controller, examples of the method are advantageous in which the at least one balancing unit is switched and/or synchronized by the engine controller.

Method variants in which an electrically operated balancing unit is used as the balancing unit can be advantageous. An electrically operated balancing unit can easily be switched off by interrupting the power supply.

An electric drive leads on account of the principle to more freedom of maneuver in the arrangement of the balancing unit in the engine compartment since the cables which are used for supplying power can be led to any location in the engine compartment. Rigid limitations such as are given in a mechanical drive are dispensed with.

If only the moments which are caused by the mass forces are balanced in an internal combustion engine, for example a three-cylinder in-line engine whose mass forces are balanced inherently by means of an electrically operated balancing unit, considerable freedom of maneuver is obtained with respect to the arrangement of the balancing weights. All that it is utilized to ensure is that the force flux which is required for the balancing is provided, which can be ensured by mechanically coupling the balancing unit to the internal combustion engine, for example by attachment. The arrangement of the balancing weights may then be carried out in such a way that the balancing moment acts in the same plane as the resulting mass moment.

In the case of a three-cylinder in-line engine, the mass moments of the first order can be balanced by two balancing weights which lie on an axis, arranged offset by 180° and are at the same distance from the central plane running through the internal cylinder and/or balance the effective resulting mass moment in this central plane and rotate at the engine speed in the opposite direction to the crankshaft.

In this context, the two balancing weights can be arranged on a common shaft which is rotated electrically or else the balancing weights are arranged separately from one another on separate shafts or rotational bodies, for example disks. The last-mentioned example is distinguished by its low weight and a reduced spatial requirement. In the case of a three-cylinder in-line engine, mass balancing of the first order could then take place by using two balancing units, wherein each balancing unit has a balancing weight which is arranged on a rotational body which can be rotated by means of an electric drive.

Method variants in which a mechanically driven balancing unit is used as a balancing unit can also be advantageous. Switching off is carried out by interrupting the drive, e.g. interrupting the force flux from the drive to the at least one balancing unit.

According to the disclosure, an internal combustion engine having at least one cylinder includes at least one balancing unit which has at least one balancing weight which serves as an unbalance and which rotates about a rotational axis when the balancing unit is operational, which is characterized in that the at least one balancing unit can be switched on and off.

What has been stated already with respect to the method according to the disclosure also applies to the internal combustion engine according to the disclosure.

Figure 2A:
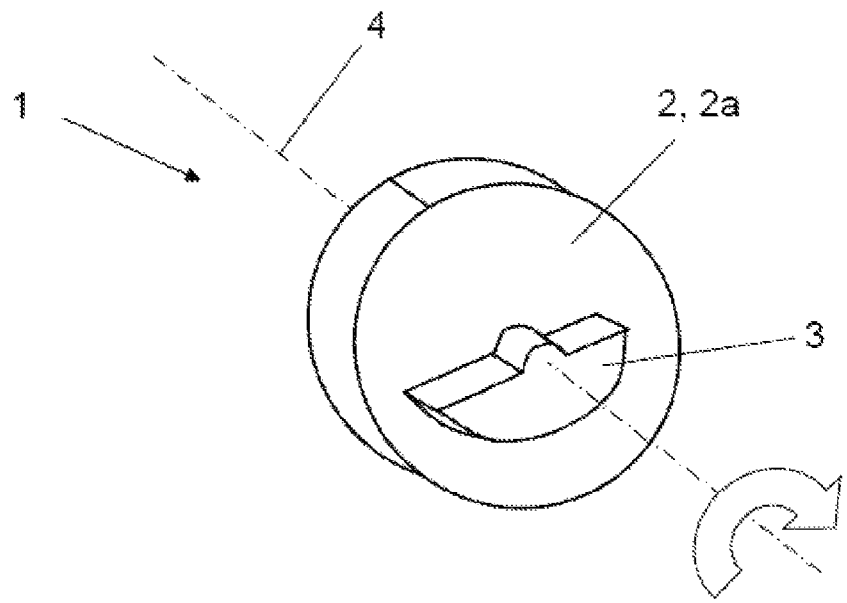
FIG. 2a shows a first embodiment of an electrically operated balancing unit.

FIG. 2a shows an embodiment of an electrically operated balancing unit 1. The illustrated balancing unit 1 comprises a balancing weight 3 which is arranged on a rotational body 2. The rotational body 2 of the embodiment illustrated in FIG. 2 is a disk 2a. When the balancing unit 1 is operational, the balancing weight 3 which serves as an unbalance rotates about a rotational axis 4.

Two of these balancing units 1 are sufficient to balance the mass moments of the first order in a three-cylinder in-line engine. The electric drive is not illustrated in FIG. 2a.

Figure 2B:
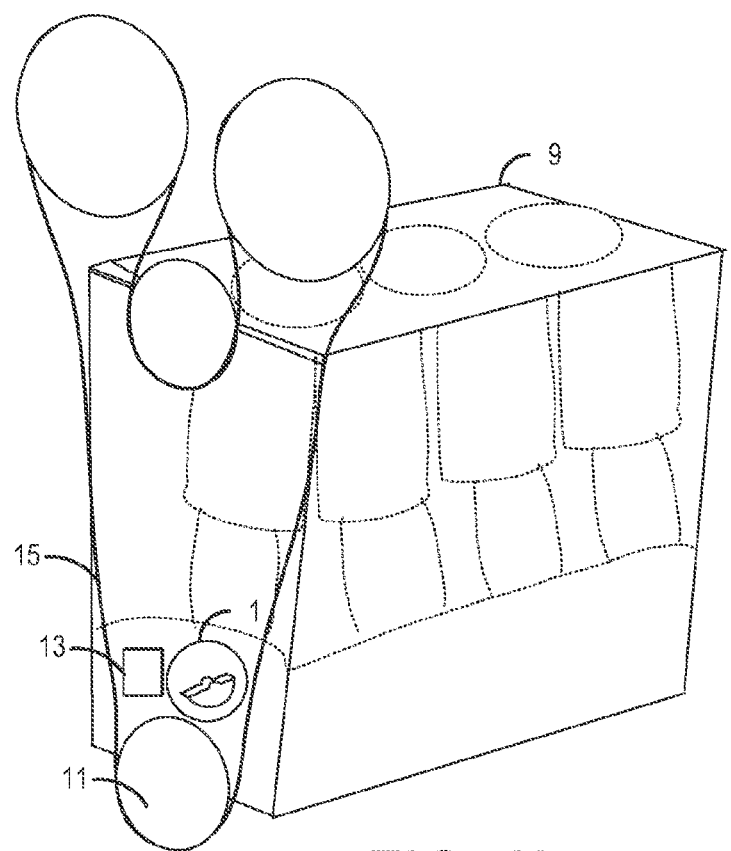

FIG. 2b illustrates an example balancing unit 1 arranged on an engine case 9. The balancing unit 1 may be arranged so that it rotates around an axis parallel to the crankshaft 11 of the engine. Further, the balancing unit 1 may be coupled to or include a motor 13 such that the balancing unit 1 is driven electronically. In this manner, the balancing unit 1 is decoupled from the crankshaft 11. As depicted in FIG. 2b, the crankshaft drives additional engine components, such as camshafts (not shown), via a belt 15.

Figure 3A:
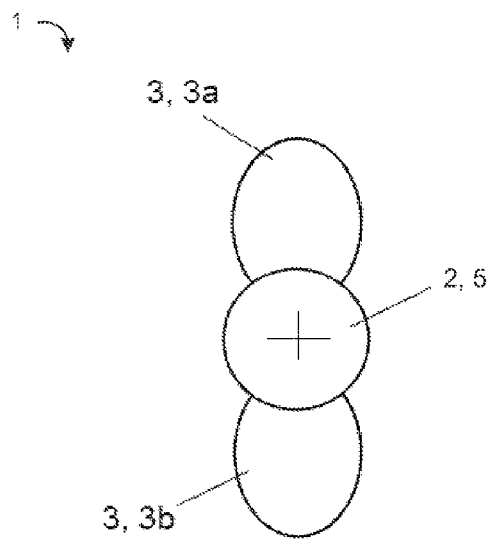
FIGS. 3a and 3c show a second embodiment of a balancing unit in the position of rest.
Figure 3B:
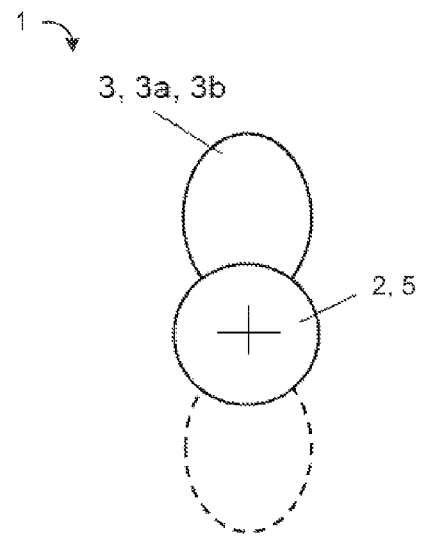
FIGS. 3b and 3d show the embodiments illustrated in FIGS. 3a and 3c in the working position.
Figure 3C:
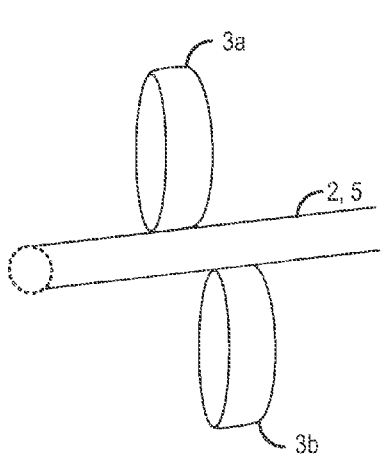

FIGS. 3a and 3c show a second embodiment of a balancing unit 1 in a position of rest. The balancing weight 3 which serves as an unbalance comprises two segments 3a, 3b, which are embodied in the manner of a wing and can be rotated in opposite directions to one another about a rotational axis which is perpendicular to the plane of the drawing. The two segments 3a, 3b are arranged rotated through 180° on a shaft 5 which serves as a rotational body 2. In the position of rest, the two segments 3a, 3b neutralize one another in their external effect. The shaft 5 may be driven electronically via a motor, or may be mechanically coupled to the crankshaft of the engine.

Figure 3D:
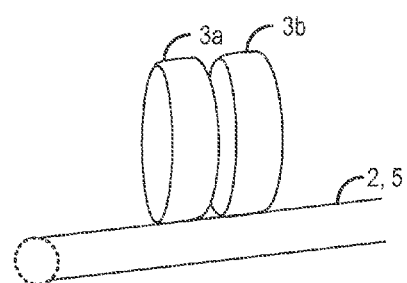

By rotating one of the two segments 3b, an unbalance is generated and the balancing weight 3 which serves as an unbalance is formed. In the working position, the two segments 3a, 3b no longer have any offset, for which purpose the second segment 3b is rotated through 180°. FIGS. 3b and 3d show the embodiment illustrated in FIG. 3a in the working position, wherein in FIG. 3b, the original position of the second segment 3b, e.g., the position at rest, is illustrated by dashed lines. As seen in FIG. 3d, when the second segment 3b is rotated, the first and second segments 3a, 3b become substantially aligned in order to rotate around the shaft together. Thus, the balancing unit 1 depicted in FIGS. 3b and 3d may include two masses, a first mass and a second mass. When the balancing unit is not activated, e.g., is in the position of rest, the first and second mass are arranged on opposite sides of a shaft relative to each other, for example the second mass may be rotated 180° relative to the first mass. When the balancing unit is activated, the second mass may be moved relative to the first mass until the first and second masses are aligned on the same side of the shaft. To move the second mass relative to the first mass, the first and second masses may be arranged on a shaft that includes multiple segments configured to be rotated independently of each other. Thus, the segment of the shaft on which the first mass is arranged may remain stationary, and the segment of the shaft on which the second mass is arranged may rotate. Once the masses are aligned, the shaft segments may be rotated together. Alternatively, the second mass may be moved into alignment via an electromagnet or other mechanism.

Examples of the internal combustion engine in which the at least one balancing unit is an electrically operated balancing unit are advantageous. Switching on and off is carried out by switching on and off the power supply. An electrically operated balancing unit is preferably fed from the on-board battery. Because the mechanical coupling is not utilized, and is therefore absent according to the principle, electrically operated balancing units are generally distinguished by a relatively low weight. It is therefore possible, for example, for a disk instead of a shaft to be used as a receptacle for the at least one balancing weight.

Examples of the internal combustion engine in which the at least one balancing unit is a mechanically driven balancing unit are also advantageous. This example is also suitable for retrofitting onto motor vehicles which are already commercially available and onto motor vehicles which have not been introduced into the market yet.

In order to construct an internal combustion engine according to the disclosure, a belt drive or gearwheel drive which has already been provided is then to be equipped with an interrupter unit, for example a clutch, which disconnects the at least one balancing unit from the mechanical drive for the purpose of switching off.

Examples of the internal combustion engine in which three cylinders are arranged in a row are advantageous, wherein the mass forces of the first order and of the second order are balanced by selecting a suitable crankshaft throw and a suitable ignition sequence.

Examples of the internal combustion engine in which the at least one balancing weight which serves as an unbalance has at least two segments which can be rotated in opposite directions to one another about the rotational axis are advantageous.

This example is particularly advantageous with respect to the switching on process of the at least one balancing unit during which the balancing unit is synchronized with the crank drive and the rotational speeds of the crankshaft and of the balancing weight are adapted or matched to one another. Under certain circumstances the balancing weights then have to be accelerated from a stationary state. Since the balancing weights do not rotate in synchronism with the crankshaft during the acceleration process, it would be disadvantageous if the balancing weights already produce their full effect as an unbalance. For this reason, the two segments which form the balancing weight are preferably positioned offset with respect to one another by 180° at the start of the switching on process with the result that the segments cancel each other out in their external effect, e.g., neutralize one another. By rotating one of the two segments, the unbalance is first generated and the at least one balancing weight which serves as an unbalance is formed. In the working position, the two segments preferably no longer have any offset, for which purpose the segment is rotated through 180°.

Figure 4:
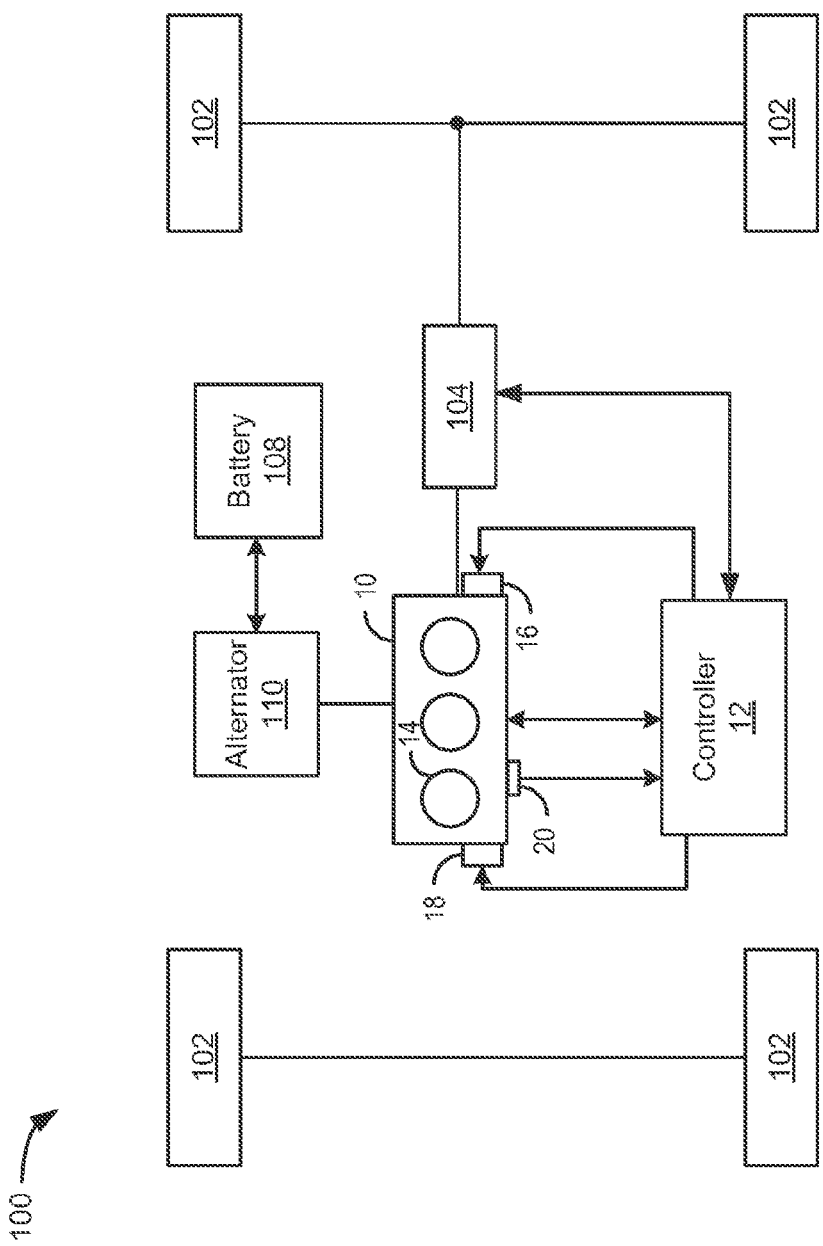
FIG. 4 schematically shows an example vehicle including an engine and a balancing unit.

As explained above, the balancing unit may be placed on an engine installed in a vehicle. FIG. 4 is a schematic depiction of vehicle 100. Vehicle 100 includes wheels 102. Torque is supplied to wheels 102 via engine 10 and transmission 104. In some examples, an electric motor or hydraulic motor may also provide torque to wheels 102. An alternator 110 may be mechanically coupled to engine 10 via a shaft or pulley. Battery 108 and alternator 110 may provide electrical power to various engine accessory components not shown in FIG. 1.

Engine 10 includes a plurality of cylinders 14. Herein, engine 10 is depicted as a three cylinder in-line engine; however other cylinder arrangements are within the scope of this disclosure. The cylinders 14 receive intake air via an intake passage, combust fuel, and expel exhaust via an exhaust passage. Also shown are two balancing units 16, 18. Balancing units 16, 18 are non-limiting examples of balancing unit 1 presented above. The balancing units may be placed in a suitable location on or near the engine, such as in an opening of the front cover of the engine. The balancing units 16, 18 may include motors to be electrically driven, or they may be mechanically driven via a direct or indirect coupling to the crankshaft of the engine.

Controller 12 is shown in FIG. 4 as a conventional microcomputer including: a microprocessor unit, input/output ports, read-only memory, random access memory, keep alive memory, and a conventional data bus. Controller 12 is shown receiving various signals from sensors coupled to engine 10, including an engine position signal from a Hall effect sensor 20 sensing crankshaft position. In a preferred aspect of the present description, engine position sensor produces a predetermined number of equally spaced pulses every revolution of the crankshaft from which engine speed (RPM) can be determined. Controller 12 is also shown controlling various aspects of the vehicle 100, including the engine 10 and balancing units 16, 18.

Thus, the above-described system includes an engine including three cylinders arranged in line, at least one balancing unit coupled to the engine and decoupled from a crankshaft of the engine, a motor to drive the balancing unit, and a controller including instructions to activate the at least one balancing unit via the motor when engine speed is below a threshold. The controller may further include instructions to deactivate the at least one balancing unit when the engine speed is above the threshold. The threshold may be an engine speed above which the operation of the balancing unit starts to degrade fuel economy, and/or the threshold may be an engine speed below which engine vibrations become noticeable to a vehicle operator. In one example, the threshold may be idle engine speed.

The balancing unit may include at least one balancing weight configured to rotate about an axis. The balancing unit may include a first mass and a second mass offset from each other on a shaft by 180° while the balancing unit is switched off. Then, when the balancing unit is switched on, the second mass may be moved relative to the first mass in order to aligned the masses with each other on the same side of the shaft.

It will be appreciated that the configurations and methods disclosed herein are exemplary in nature, and that these specific examples are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for balancing mass forces of a crank drive of an internal combustion engine having at least one cylinder, comprising:
providing at least one balancing unit which has at least one balancing weight which serves as an unbalance and which rotates about a rotational axis when the balancing unit is operational, the at least one balancing unit being embodied as a switchable balancing unit; and
switching on and off the at least one balancing unit as a function of at least one operating parameter of the internal combustion engine, wherein the at least one balancing unit is switched on as a function of a rotational speed n of the internal combustion engine; and
if the balancing unit is operational, switching off the at least one balancing unit as soon as the rotational speed n of the internal combustion engine exceeds a predefinable rotational speed $n_{threshold,up}$ and is higher than a predefineable rotational speed $n_{threshold,up}$ for a predefinable time period $\Delta t_1$.

2. The method as claimed in claim 1, wherein the at least one balancing unit includes a motor.

3. The method as claimed in claim 1, where the at least one balancing unit includes two wings.

4. The method as claimed in claim 3, where the two wings rotate in opposite directions.

5. The method as claimed in claim 1, further comprising, if the balancing unit is not operational, then switching on the at least one balancing unit as soon as the rotational speed n of the internal combustion engine undershoots a predefinable rotational speed $n_{threshold,down}$.

6. The method as claimed in claim 5, wherein the at least one balancing unit is switched on as soon as the rotational speed n of the internal combustion engine undershoots the predefinable rotational speed $n_{threshold,down}$ and is lower than the predefined rotational speed $n_{threshold,down}$, for a predefinable time period $\Delta t_2$.

7. The method as claimed in claim 1, further comprising, during the switching on of the at least one balancing unit, synchronizing the at least one balancing unit with the crank drive of the internal combustion engine.

8. The method as claimed in claim 1 wherein the at least one balancing unit is switched on by an engine controller.

9. The method as claimed in claim 1, wherein the balancing unit is electrically operated.

10. The method as claimed in claim 1, wherein the balancing unit is mechanically driven.

11. An internal combustion engine comprising:
at least one cylinder; and
at least one motor driven balancing unit including at least one balancing weight which serves as an unbalance and which rotates about a rotational axis when the balancing unit is operational, wherein the at least one balancing unit is configured to be switched on and off.

12. The internal combustion engine as claimed in claim 11, wherein the at least one balancing unit includes two segments that are aligned and rotate together.

13. The internal combustion engine as claimed in claim 12, wherein one of the two segments is rotatable with respect to the other of the two segments.

14. The internal combustion engine as claimed in claim 11, wherein the at least one balancing weight which serves as the unbalance comprises two segments configured to be rotated in opposite directions to one another about the rotational axis.

15. The internal combustion engine as claimed in claim 11, further comprising three cylinders arranged in a row.

16. A system, comprising:
an engine including three cylinders arranged in line;
at least one balancing unit coupled to the engine and decoupled from a crankshaft of the engine;
a motor configured to drive the at least one balancing unit; and
a controller including instructions to:
activate the at least one balancing unit via the motor when engine speed is below a threshold.

17. The system of claim 16, wherein the controller includes further instructions to deactivate the at least one balancing unit when engine speed is above the threshold.

18. The system of claim 16, wherein the at least one balancing unit includes at least one balancing weight configured to rotate about a rotational axis.

19. The system of claim 18, wherein the balancing unit comprises a first mass and a second mass offset from each other around a shaft by 180° when the balancing unit is switched off.

20. The system of claim 19, wherein the controller includes further instructions to move the second mass relative to the first mass to align the first and second masses on the shaft in response to the balancing unit being switched on.

* * * * *